United States Patent [19]

Su

[11] 4,455,991
[45] Jun. 26, 1984

[54] FOLDING BARBECUE

[76] Inventor: Wen-Kuang Su, P.O. Box 87-301, Taipei, Taiwan

[21] Appl. No.: 398,420

[22] Filed: Jul. 14, 1982

[51] Int. Cl.³ .............................................. F24C 1/16
[52] U.S. Cl. ................................ 126/9 R; 126/25 R; 220/6
[58] Field of Search ............ 126/9 R, 9 A, 9 B, 25 R, 126/144, 29, 30; 220/6, 7; 99/449, 450; 211/132, 149, 181, 195, 198

[56] References Cited

U.S. PATENT DOCUMENTS

| 1,198,524 | 9/1916 | Cunliffe | 220/6 |
| 1,212,162 | 1/1917 | Green | 126/9 R |
| 1,822,448 | 9/1931 | Morin | 220/6 |
| 2,917,039 | 12/1959 | Sheedlo | 126/9 R |

FOREIGN PATENT DOCUMENTS 991012  6/1951  France ................. 126/9 R

*Primary Examiner*—Lee E. Barrett

[57] ABSTRACT

A folding barbecue composed of bottom and four wall panels, the bottom panel is pivotably connected with respective wall panel, any two adjacent panels are provided with a passage at adjacent edges and secured by passing one pin upwardly through said passage, and said pin has its lower end to serve as the leg support of the barbecue. This barbecue may be folded into a flat shape adapted for carrying or storage and also may be treated as a disposable commodity due to low cost.

6 Claims, 5 Drawing Figures

FOLDING BARBECUE

This invention relates to a folding barbecue in small size, particularly to a barbecue which may be folded into a flat shape adapted for carrying or storage and to be used as a disposable commodity.

A conventional barbecue is made by casting of ferrous metal resulting in being quite big and heavy to an extent that it is invonvenient for handling, carrying and storage.

The main object of the present invention is to provide a novel holding barbecue which is very simple in construction such that it can be folded into a maximum possible flat shape.

Another object of the present invention is to provide said barbecue such that it may be disposable due to low cost, without necessary to do any cleaning.

The aforementioned objects will be accomplished by the present invention which provides a folding barbecue composed of a bottom and four wall panels, said bottom panel is pivotably connected with the respective wall panels, any two adjacent panels are provided with a passage at adjacent edges and secured by passing one pin upwardly through said passage, and said pin has its lower end to serve as a leg support of the barbecue.

The present barbecue is very simple in construction and readily able to be folded into a flat shape as soon as withdrawl of the pins, so that it is also convenient for assembling and disassembling.

Other objects and features of the present invention will be apparent from the following description with reference to the accompanying drawings, in which.

Figure 1:
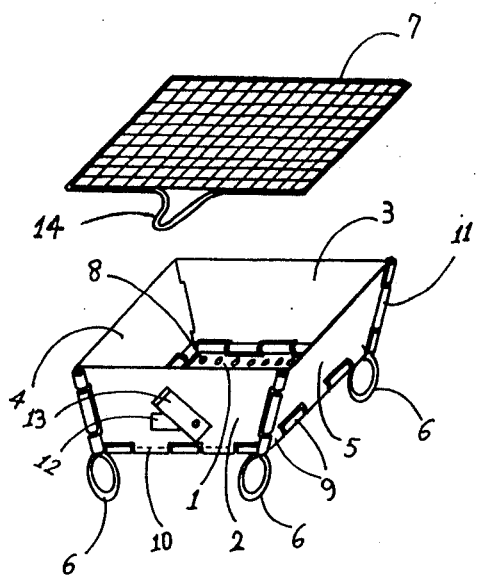
FIG. 1 is a perspective view of one embodiment of the barbecue according to the present invention, shown in assembled state.

Now, referring to FIG. 1, the barbecue according to the present invention comprises a bottom panel, four wall panels including front panel 2, rear panel 3, left panel 4 and right panel 5, and a plurality of leg supports 6 as well as a grill 7. The bottom panel 1 is provided with a plurality of openings 8 which has a size suitable to retain the solid fuels, such as coals or woods, placed thereon and to permit the ashes freely to drop therethrough. In this embodiment, the bottom panel 1 itself serves as the grate. The bottom panel 1 at its perimeter is pivotably connected with the four wall panels 2, 3, 4 and 5, in such a way that said bottom 1 and said four panels 2, 3, 4 and 5 at respective adjacent edges are formed with an aligned pivot passage 9 which is pivotably secured by passing a pivot pin 10 therethrough. In similar manner, any two adjacent wall panels, such as panels 2 and 4, 3 and 4, 2 and 5 or 3 and 5, at adjacent edges are formed with a passage 11 which is pivotably secured by passing a pin 6 upwardly through said passage 11. But said pin 6 at its outside, lower end, is formed with a leg support. In this embodiment as illustrated said leg support has an enlarged portion in a shape of a ring. Since four leg supports 6 at the four corners of the barbecue are at the same level, thereby, the barbecue is stably supported.

The front panel 2 at substantially its central portion is provided with a wind opening 12, pivotably mounted with a cover plate 13. Said cover plate 13 may be pivotably moved up and down to adjust the wind passage as desired. Of course, the cover plate 13 may be mounted vertically instead of horizontally as illustrated with respect to said wind opening 12, and correspondingly pivotably moved left and right.

The panels 2, 3, 4 and 5 may be in a form of a rectangle, but preferably are in inverted trapezoid form as illustrated, such that the assembled barbecue will have a top perimeter greater than the bottom panel. The grill 7 preferably has a dimension slight greater than said top perimeter in order that the former may be directly placed over the latter. The handle 14 is helpful to operate said grill 7. The necessary solid fuels, such as coals or woods, may be placed on the bottom 1.

As mentioned above, the barbecue according to the present invention is simple in construction and has the least number of parts. The bottom 1 and wall panels 2, 3, 4 and 5 may be formed from thin metal plate by punching. As regards the pin leg support 6 this may be cut and bent from a wire having suitable guage.

Figure 2:
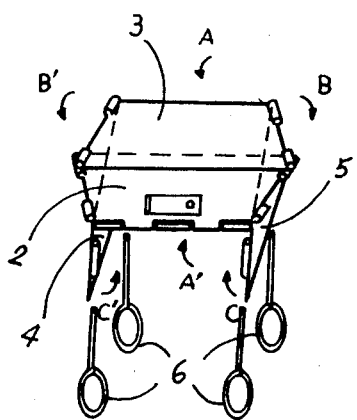
FIG. 2 is a perspective view of the barbecue illustrated in FIG. 1, shown in progressive folding state.
Figure 3:
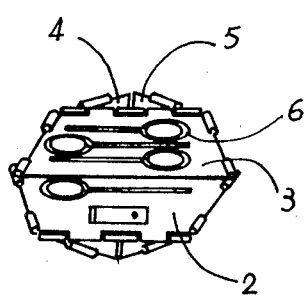
FIG. 3 is a view of the barbecue, shown in completely folded state.

This barbecue is readily folded. As shown in FIG. 2, one only needs to withdraw all leg supports 6 out of the passages 11 downwardly, then the four panels 2, 3, 4 and 5 will extend out. At this time, for example, the front panel 2 and rear panel 3 are folded in the direction as shown by arrows A and A', respectively, over the bottom panel 1 while the left and right panels 4 and 5 are folded downwardly in the direction as shown by arrows B and B', respectively, as the illustrated state, then further folded beneath the bottom 1 in the direction as shown by arrows C and C' to assume the flat state as shown in FIG. 3. Subsequently, the leg supports 6 are all placed thereover, then the grill 7 may be superposed at topmost (not shown in FIG. 3). The volume in folded state is greatly reduced compared with the assembled state as shown in FIG. 1. The assembling procedure from the state of FIG. 3 to that of FIG. 1 is just the reverse of the folding or disassembling procedure as described above.

Figure 4:
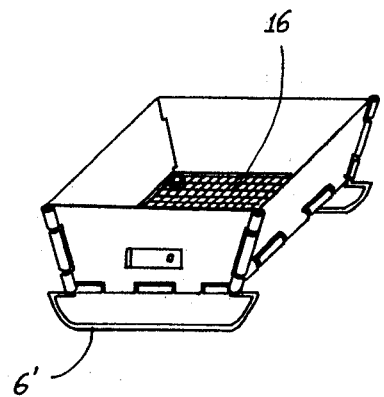
FIG. 4 is a perspective view similar to FIG. 1, showing modifications.
Figure 5:
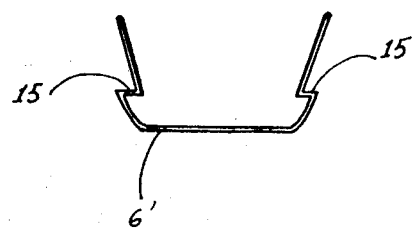
FIG. 5 is a perspective view of a modified leg support.

FIG. 4 shows a modified embodiment in which the bottom is a blind panel, and a separate grate 16 is disposed on that bottom to have a suitable height in conventional manner. Further, the leg support 6 may be replaced by a U-shaped one 6'. In this manner, each U-shaped leg support 6' will be inserted into two aligned passages at any side, then two supports 6' in parallel will be sufficient to support the barbecue as shown in FIG. 4. The U-shaped leg support 6' preferably forms a respective step 15' at each leg portion, as best seen in FIG. 5.

The aforementioned embodiments serve only for illustrative purposes and by no means to restrict the scope of the present invention. Any further modifications can easily be made by those skilled in the art and should be considered within the scope of the attached claims.

What I claim is:

1. A folding barbecue comprising a bottom panel, and four wall panels, each pivotably connected with one side of said bottom panel, any two adjacent panels being provided with passage means which cooperate to form a passage at their adjacent edges, and a plurality of pins, passing upwardly through the passages to secure the barbecue in assembled state, the lower ends of said pins serving as leg supports of the barbecue and having support means provided thereon to support the assembled barbecue off the ground, two of said wall panels being foldable over said bottom panel and the other two of said wall panels being foldable beneath the bottom panel, whereby said barbecue can assume a substantially flat state as soon as said leg supports are withdrawn.

2. The barbecue as set forth in claim 1, wherein each wall panel is in an inverted trapezoidal shape.

3. The barbecue as set forth in claim 1, wherein said bottom panel is formed with a plurality of openings.

4. The barbecue as set forth in claim 1, wherein said support means comprises an enlarged portion at the lower end of each pin.

5. The barbecue as set forth in claim 1, wherein said support means comprise a pair of U-shaped leg members, each U-shaped leg member being connected to two of said pins.

6. A folding barbecue comprising a bottom panel in the form of a blind plate, a separate grate disposed on said bottom panel, and four wall panels, each pivotably connected with one side of said bottom panel, any two adjacent panels being provided with passage means which cooperate to form a passage at their adjacent edges, and a plurality of pins, passing upwardly through the passages to secure the barbecue in assembled state, the lower ends of said pins serving as leg supports of the barbecue and having support means provided thereon to support the assembled barbecue off the ground.

* * * * *